(No Model.)

S. J. KENNERLY & T. J. COX.
EXPANSIBLE PULLEY.

No. 547,641. Patented Oct. 8, 1895.

WITNESSES:
F. L. Ouraud.
W. L. Coombs

INVENTORS:
Samuel J. Kennerly and
Thomas J. Cox,
G. Louis Bagger Attorneys.

UNITED STATES PATENT OFFICE.

SAMUEL J. KENNERLY AND THOMAS J. COX, OF GAINESVILLE, TEXAS.

EXPANSIBLE PULLEY.

SPECIFICATION forming part of Letters Patent No. 547,641, dated October 8, 1895.

Application filed July 26, 1895. Serial No. 557,216. (No model.)

*To all whom it may concern:*

Be it known that we, SAMUEL J. KENNERLY and THOMAS J. COX, residents of Gainesville, in the county of Cooke and State of Texas, have invented certain new and useful Improvements in Expansible Pulleys; and we do hereby declare that the following is a full, clear, and exact description of the invention, which will enable others skilled in the art to which it appertains to make and use the same, reference being had to the accompanying drawings, which form a part of this specification.

Our invention relates to improvements in expansible pulleys, or pulleys of that character or description which may be expanded or contracted, so as to increase or decrease the circumference thereof, as the case may be; and its object is to provide an improved construction of the same, whereby I secure superior advantages with respect to efficiency in use.

The invention consists in the novel construction and combination of parts hereinafter fully described and claimed.

Figure 1:
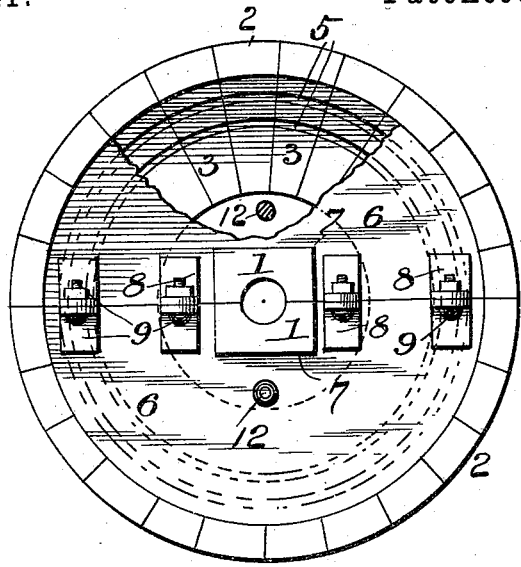
Figure 2:
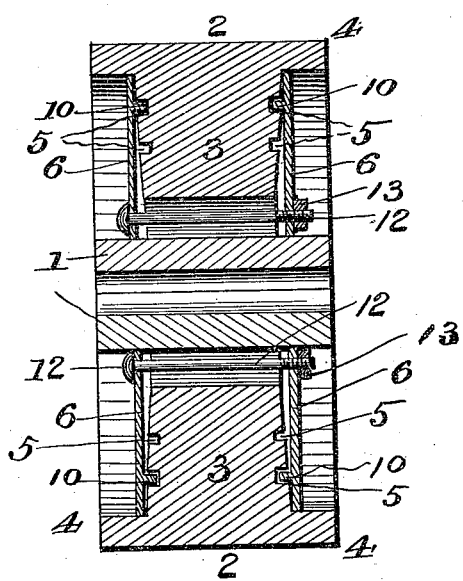
Figure 3:
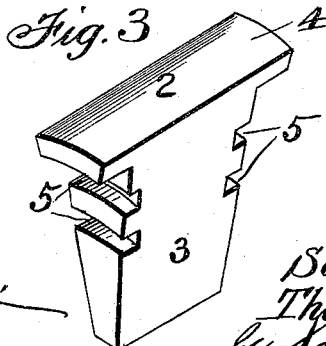

In the acccompanying drawings, Figure 1 is a side elevation of a pulley constructed in accordance with our invention, partly broken away to show the interior construction thereof. Fig. 2 is a central vertical section of the same. Fig. 3 is a perspective view of one of the segmental sections comprising the periphery of the pulley.

In the said drawings, the reference-numeral 1 designates two bearings or half-round boxes, which together form a rectangular hub having a central cylindrical opening for the passage of a shaft. (Not shown.)

The numeral 2 designates a series of segmental blocks, formed with tapering portions 3 and with curved outer portions 4, the ends of which overlap the tapering portions 3. On each face or end of said tapering portions are formed two or more curved grooves 5, which when the sections are placed in position, as hereinafter described, form a series of annular concentric grooves, with which the ribs hereinafter described engage.

The numberal 6 designates four semicircular plates having rectangular recesses 7, which engage with the two-part hub. There are two of these plates 6 at each side of the pulley, provided near their meeting edges with angle plates 8, the free ends of which are formed with apertures for the passage of screw-bolts 9, by which they are connected together. The inner faces of these plates 6 are formed with semicircular ribs 10, which engage with the grooves in the segment-sections. The plates 6 on opposite sides of the pulley are connected together by means of screw-bolts 12 and nuts 13.

The manner of assembling the parts to form the pulley is as follows: The two-part hub 1 is engaged with the rectangular recess in the plates 6 and the segment-blocks 2 placed in position so as to form a circle, with the ribs 10 in the plates 6 engaging with the grooves therein. The opposite plates are then connected by means of the bolts 12 and nuts 13 and the two plates on each side connected with each other by means of the angle-plates 8, secured thereto, and the screw-bolts 9. This will cause the segment-blocks to be securely held in place, the tapering portions thereof bearing against each other. To expand the pulley, so as to increase its circumference and consequently its size, the bolts are unloosened, so that the segment-blocks may be drawn out and the ribs of the plates 6 engaged with the next grooves therein.

Having thus fully described our invention, what we claim is—

1. In an expansible pulley, the combination with the tapering and adjustable blocks having curved grooves in their faces, of the semicircular plates having ribs engaging therewith, and means for securing them together; substantially as described.

2. In an expansible pulley, the combination with the segmental blocks comprising the tapering portions having curved grooves in their ends and the overlapping curved outer portions, of the two-part rectangular hub, the semicircular plates having rectangular recesses engaging with said hub, also having ribs on the inner faces thereof engaging with the grooves in said blocks, the angle plates and screw-bolts for connecting the angle plates on one side to each other, and the transverse bolts connecting the semi-circular plates on opposite sides of the pulley together; substantially as described.

In testimony that we claim the foregoing as our own we have hereunto affixed our signatures in presence of two witnesses.

SAMUEL J. KENNERLY.
THOMAS J. COX.

Witnesses:
J. I. WISEMAN.
W. P. LOCKORD.